United States Patent
Smith

[11] 3,710,216
[45] Jan. 9, 1973

[54] SCR MOTOR SPEED CONTROL WITH PLUG SENSING CIRCUIT

[75] Inventor: Aubrey H. Smith, Pershing Boulevard, Kenosha, Wis. 53140

[73] Assignee: Eaton Corporation

[22] Filed: April 6, 1971

[21] Appl. No.: 131,624

[52] U.S. Cl. .............................................. 318/373
[51] Int. Cl. ............................ H02p 3/10, H02p 5/16
[58] Field of Search ..... 321/45 C; 318/284, 293, 300, 318/367, 373, 261, 262, 341

[56] References Cited

UNITED STATES PATENTS

| | | | |
|---|---|---|---|
| 3,437,826 | 4/1969 | Kelley | 318/341 |
| 3,344,328 | 9/1967 | Morris | 318/373 |
| 3,562,611 | 2/1971 | Gurwicz | 321/45 C |
| 3,436,632 | 4/1969 | Tisserant | 318/284 |
| 3,500,161 | 3/1970 | Domann | 318/341 |
| 3,582,763 | 6/1971 | Huber | 321/45 C |
| 3,588,654 | 6/1971 | Balasz | 318/341 |

*Primary Examiner*—Bernard A. Gilheany
*Assistant Examiner*—Thomas Langer
*Attorney*—Teagno & Toddy and Eaton Yale & Towne Inc.

[57] ABSTRACT

A control system for controlling energy directed from a power source to a DC variable speed motor includes a main SCR, series connected with the motor, an oscillator, a sawtooth generator, a reference operational amplifier, and a firing pulse generator. The output of the sawtooth generator is summed with the output of the reference operational amplifier and directed to the firing pulse generator. When the summed output of the reference operational amplifier and the sawtooth generator exceeds the threshold voltage of the firing pulse generator, the firing pulse generator will fire to effect conduction of the main SCR to direct energy to the motor. A commutating circuit is provided for turning the main SCR off during each cycle of the oscillator. The commutating circuit includes a secondary SCR and a LC resonant circuit both of which are parallel connected to the main SCR. The LC resonant circuit acts to reverse bias the main SCR upon conduction of the secondary SCR. A regulated power supply is also provided to energize the various components of the control system. The regulated power supply includes a negative power supply which comprises an astable multivibrator and a diode-capacitor matrix for directly converting a positive voltage to a regulated negative voltage.

14 Claims, 10 Drawing Figures

INVENTOR
AUBREY H. SMITH
BY Teagno and Toddy
ATTORNEYS

SCR MOTOR SPEED CONTROL WITH PLUG SENSING CIRCUIT

The present invention relates to a control system for controlling energy directed from a power source to a load and more specifically to a control system utilizing a controlled rectifier for controlling the flow of energy from the power source to a variable speed motor.

Control systems are known in the art for controlling energy applied to a variable speed motor from a power source. Some known control systems utilize controlled rectifiers which are fired at an adjustable frequency to control the speed of the motor. This type of system suffers from the disadvantage that when slow speeds are desired, the motor is pulsed very slowly and does not run smoothly. Other known systems utilize very high frequency firing of the controlled rectifiers to alleviate the aforementioned problem. However, when very high frequency firing of the controlled rectifier is utilized power dissipation from the controlled rectifier becomes a problem and overheating often occurs.

Accordingly, it is an object of the present invention to provide a new and improved control system for controlling the energy directed from a power source to a load utilizing a controlled rectifier and wherein the foregoing problems are alleviated.

Another object of the present invention is to provide a new and improved control system for controlling the energy directed from a power source to a load including a main SCR series connected with the load which is intermittently pulsed to an on condition to control the energization of the load and a commutating circuit including a secondary SCR connected in parallel with the main SCR and a LC resonant circuit connected in parallel with the secondary SCR. The LC circuit normally charges to a first polarity and discharges, upon conduction of the secondary SCR to a second polarity opposite the first polarity. The LC circuit when discharging reverse biases the main and secondary SCRs to render the SCRs nonconductive.

A further object of the present invention is to provide a new and improved control system for controlling the energy directed from a power source to a load including a regulated negative power supply comprising an astable multivibrator and a diode-capacitor matrix connected to the astable multivibrator for inverting the positive voltage supplied to the astable multivibrator directly to a regulated negative voltage.

Still another object of the present invention is to provide a new and improved control system for controlling energy directed from a power source to a motor including controlled rectifying means connected to the motor for controlling the energization thereof, pulse generating means for generating repetitive pulses of a predetermined period, firing pulse generating means connected to the pulse generating means for rendering the controlled rectifying means conductive at a predetermined time during each of the predetermined periods, commutating circuit means for rendering the controlled rectifying means nonconductive at the end of each of the predetermined periods, ramp generating means for generating a ramp signal upon acceleration of the motor from a zero speed condition, speed and direction sensing means, first control means for controlling the direction of rotation and the speed of the motor, the speed and direction sensing means effecting a zero output from the ramp generating means when the speed and direction sensing means senses the rotation of the motor to be opposite the direction of rotation called for by the first control means, second control means having an input from the ramp generating and an output connected to the firing pulse generating means to control the period of conduction of the controlled rectifying means, the controlled rectifying means being nonconductive when the second control means has an output below a predetermined level, dynamic braking means responsive to the speed and direction sensing means for applying an input to the second control means when the speed and direction sensing means senses the direction of rotation of the motor to be opposite the direction of rotation called for by the first control means to enable the second control means to effect conduction of the controlled rectifying means at a predetermined level to thereby dynamically brake the rotation of the motor, power supply means connected to the power source for applying predetermined potentials and bypass means for rendering the controlled rectifying means nonconductive and connecting the power source directly to the motor when the first control means is actuated to a full speed condition.

Another object of the present invention is to provide a new and improved control system for controlling energy directed from a power source to a load including first controlled rectifying means, second controlled rectifying means connected in parallel to the first controlled rectifying means, energy storage means connected in parallel to the second controlled rectifying means for applying a potential to the first and second controlled rectifying means to render the first and second controlled rectifying means nonconductive, means for charging the energy storage means to a first polarity, and means for rendering the second controlled rectifying means conductive for discharging the energy storage means through the second controlled rectifying means causing the energy storage means to be charged to a second polarity opposite the first polarity and wherein the energy storage means when charged to the second polarity applies the potential to the first and second controlled rectifying means to thereby render the first and second controlled rectifying means nonconductive.

A further object of the present invention is to provide a power supply for producing a regulated voltage including a power source, an astable multivibrator having a first gate and a second gate, each of the gates being connectable to the power source and having first and second output conditions, the first gate having the first output condition when the second gate has the second output condition and the first gate having the second output condition when the second gate has the first output condition, first energy storage means connected to the output of the first gate, second energy storage means connected to the output of the second gate third energy storage means connected to the first and second energy storage means and operable to apply a predetermined voltage, the first energy storage means charging when the first gate is in the first condition and discharging when the first gate is in the second condition, the second energy storage means charging when the second gate is in the first condition and discharging when the second gate is in the second condition, the third energy storage means being charged by the first energy storage means when the first gate is in the second condition and being charged by the second energy storage means when the second gate is in the second condition, the third energy storage means being charged by the first and second energy storage means to the predetermined voltage and voltage regulating means connected across the third energy storage means for regulating the voltage applied by the third energy storage means.

Further objects and advantages of the present invention will become apparent fm .e following detailed description of the present invention taken in conjunction with the following drawings wherein:

The present invention relates to a control stem for controlling energy directed from a power source to a motor. A controlled rectifier means, preferably a SCR, is connected between the motor and the power source for controlling the energization of the motor. A firing pulse generator is connected to the gate of the SCR for firing the SCR at predetermined times to effect a pulse-width modulation of the power source applied to the motor to thereby control the speed of the motor. A commutating circuit including a second controlled rectifier, preferably a second SCR, is connected in parallel with the fir SCR to effect switching of the first SCR from a conductive to a nonconductive condition. Associated with the firing pulse generator and the commutating circuit is various control circuitry for optimizing the control of the motor. A regulated power supply is provided for energizing the various control circuitry.

Figure 1:
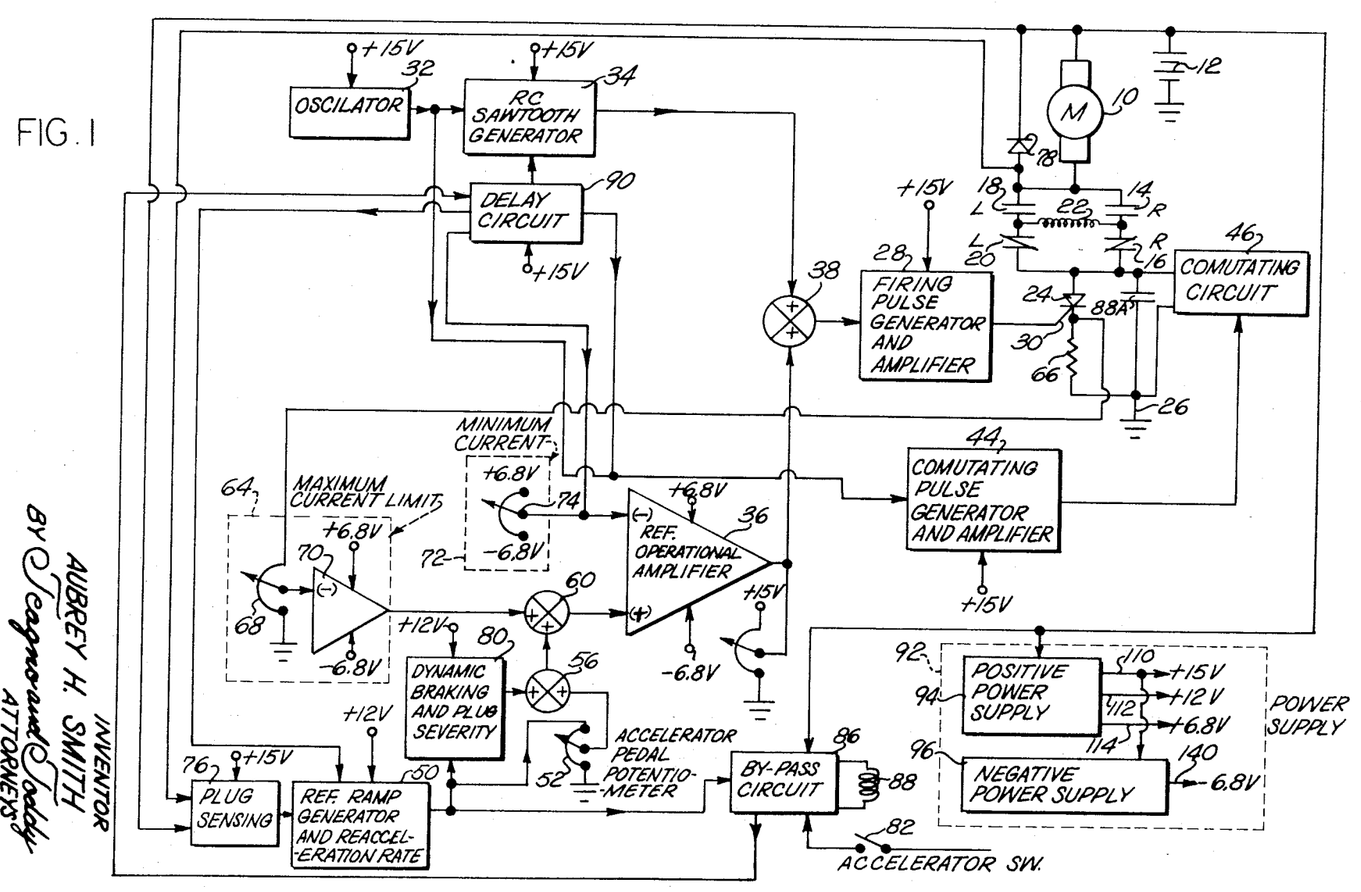
FIG. 1 is a schematic block diagram illustrating present invention.

The present invention illustrated in FIG. 1 is utilized in conjunction with a DC variable speed motor 10. The motor 10 may be used in various embodiments but is preferably used for driving a vehicle such as a forklift truck. The motor 10 has connected to one terminal thereof a battery 12. Connected to the opposite side of the motor 10 are contacts 14, 16, 18, and 20 which control the polarity of the voltage developed across the field 22 of the motor 10 to thereby control the direction of rotation of the motor. The contacts 14 and 16 are respectively closed and opened when the field of the motor is energized to effect rotation of the motor 10 in a reverse direction and contacts 18 and 20 are respectively closed and opened when the field 22 is energized to effect a rotation of the motor 10 in a forward direction.

Series connected to the motor 10 is a main SCR 24. When the SCR 24 is conductive a circuit is completed from the battery 12, through the motor 10, through closed contact 14 or 18, through the field 22, through the closed contact 16 or 20 and through the SCR 24 to the ground 26 to thereby effect rotation of the motor 10 in a direction determined by the closed ones of the contacts 14—18. The speed of the motor 10 is controlled by pulsing the SCR on and off for predetermined periods of time. The longer the period of time that the SCR 24 conducts the greater will be the speed of the motor 10 and conversely, the shorter the period the SCR 24 conducts the slower the speed of the motor 10. Thus, closing of certain of the contacts 14—18 control the direction of rotation of the motor 10 and the period of conduction of the main SCR 24 controls the speed of the motor by pulse-width modulating the energy applied to the motor by the battery 12.

Figure 6:
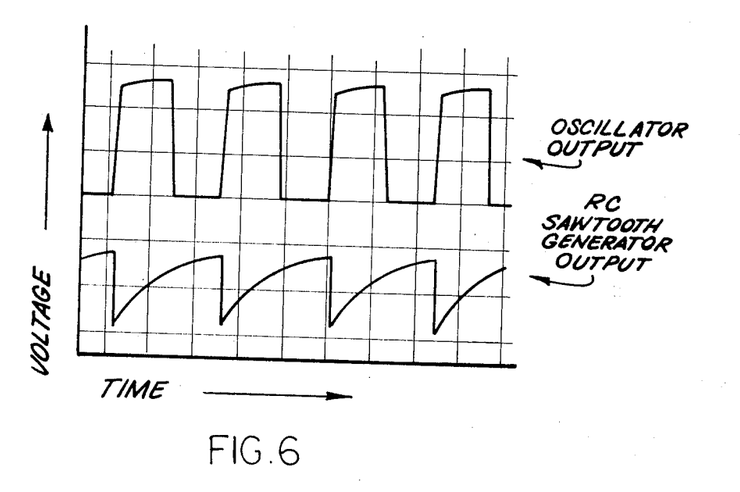
FIG. 6 is a graphical illustration showing the output of the oscillator and the RC sawtooth generator.

The firing or conduction of the SCR 24 is controlled by a firing pulse generator and amplifier 28 which is operable to apply pulses at predetermined times to the gate 30 of the SCR 24. As is known in the art when a pulse applied to the gate of sawtooth generator SCR and the anode is positive with respect to the cathode, the SCR will be rendered conductive. An oscillator 32, a RC sawtoothenerator 34 and a reference operational amplifier 36 control the input to the firing pulse generator and amplifier 28 to control the period of conduction of the SCR 24. The oscillator 32 is preferably a 200-Hz oscillator which is well known the art and which produces a square wave output as is shown in FIG 6. The output of the oscillator 32 is fed to the RC sawtooth generator 34 which produces a sawtooth wave, illustrated in FIG. 6, having a frequency of the same frequency as the output of oscillator 32. The output of the RC sawtooth generator is applied to a summing junction 38 along with output of the reference operational amplifier 36. The output of the reference operational amplifier 36 is a DC output which is added to the sawtooth wave output of the RC sawtooth generator 34 at the summing junction 38. The combined signal of the sawtooth generator and DC output of amplifier 36 are applied to the firing pulse generator 28. The firing pulse generator and amplifier 28 is triggered when the threshold voltage thereof is reached at the summing junction 38 to there apply a firing pulse to the gate 30 of the SCR 24 to effect conduction thereof.

Figure 7:
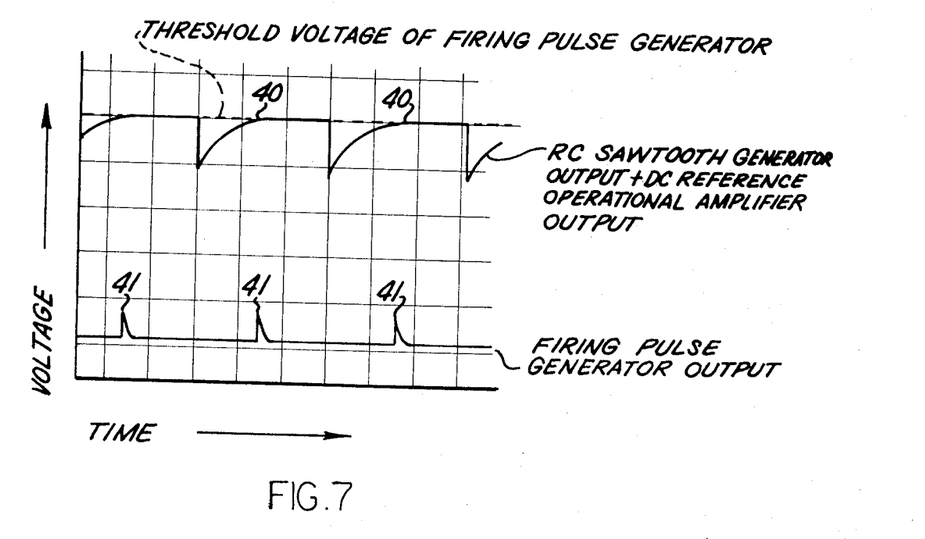
FIG. 7 is a graphical illustration of the output of the firing pulse generator and the output of the sawtooth generator combined with the output the reference operational amplifier.
Figure 8:
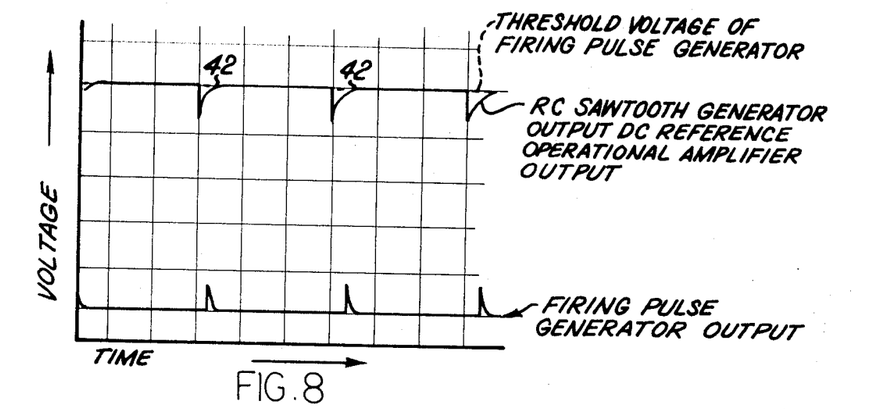
FIG. 8 is a schematic illustration similar to FIG. 7 illustrating the firing pulse generator output and the sawtooth generator output when combined with a reference operational amplifier output which is larger than that illustrated in FIG. 7.

The level of the DC output of the reference rational amplifier 36 controls the point at which the output of summing junction 38 exceeds the threshold voltage of the firing pulse generator 28. For example, the firing pulse generator will be fired earlier in a cycle if the magnitude of the DC output from amplifier 36 is high. Conversely, the firing pulse generator 28 will be fired later in a cycle if the magnitude of the DC output from amplifier 36 is lower. FIGS. 7 and 8 graphically illustrate the output of the firing pulse generator 28 and the output of the summing junction 38, which is the output of the RC sawtooth generator 34 having the DC output of the reference amplifier 36 added thereto. In FIG. 7 the operational amplifier 36 has a first DC output level which causes the sawtooth wave to exceed the threshold voltage of the firing pulse generator 28 at the points schematically illustrated as 40 so as to effect an output from the firing pulse generator 28 schematically illustrated as the pulse 41. In FIG. 8 the output of the reference operational amplifier 36 has been increased over that illustrated in FIG. 7 and the sawtooth wave exceeds the threshold voltage of the firing pulse amplifier 28 at a point 42 which precedes the point 40 as shown in FIG. 7. When the sawtooth wave exceeds the threshold voltage at the point 42, the firing pulse generator 28 initiates an output pulse 43 to affect conduction of the SCR 24. Thus, the point, during each cycle of the sawtooth wave at which the firing pulse generator 28 fires the SCR 24 is controlled by the DC output level of the reference amplifier 36.

Figure 9:
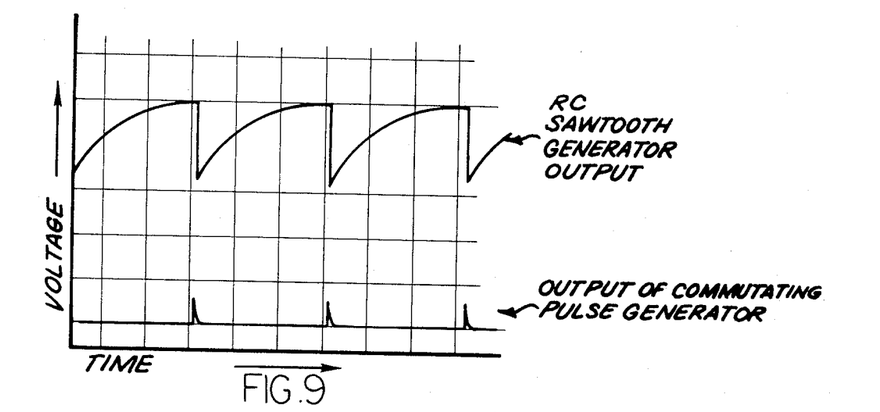
FIG. 9 is a graphical illustration showing the RC sawtooth generator output and the output of the commutating pulse generator.

The output of oscillator 32 is also fed to a commutating pulse generator and amplifier 44. The output of the commutating pulse generator and amplifier 44 is a pulsating output wherein the pulses occur simultaneously with the end of each cycle of the sawtooth wave of the sawtooth generator 34. This is schematically illustrated in FIG. 9. The output of the commutating pulse generator is then directed to a commutating circuit 46 which is operable to reverse bias the SCR 24, thereby making the cathode positive with respect to the anode thereof to render the SCR 24 nonconductive.

It should be appreciated that the firing pulse generator and amplifier 28 turns the SCR 24 on once during each cycle of the oscillator 32 and that the commutating pulse generator and amplifier 44 and commutating circuit 46 turn the SCR 24 off at the end of each cycle of the oscillator 32. This effects pulse-width modulation of the output of the battery 12 through the 10. The point at which the SCR 24 starts to conduct controls the period of conduction of the SCR 24 during each cycle. Thus, an increased output from the operational amplifier 36 causes the SCR 24 to conduct earlier during each cycle of the oscillator 32 and for a longer period of time, since the SCR 24 is not turned off until the end of the cycle of the oscillator 32. Conversely, a decrease in the output of the reference operational amplifier 36 causes the SCR 24 to turn on later during a cycle of the oscillator 32 and accordingly the period of conduction of the SCR 24 is decreased. The period of conduction of the SCR controls the speed of the motor 10 by pulse-width modulating the power applied thereto from battery 12.

Figure 10:
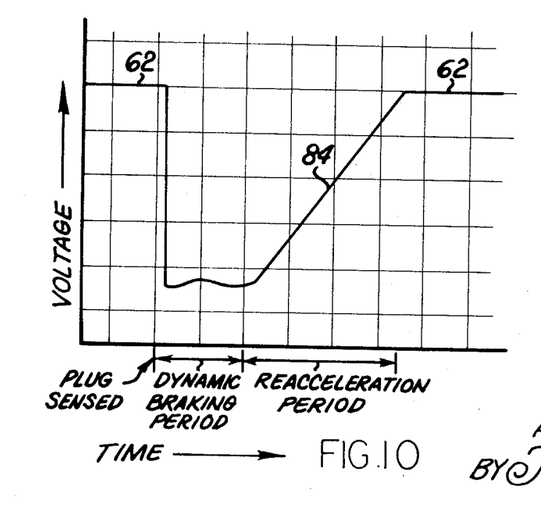
FIG. 10 is a graphical illustration of the output of the reference ramp generator showing the output thereof when a plug is sensed.

The reference operational amplifier 36 receives a DC input from a reference ramp generator and reacceleration rate circuit 50 via an accelerator pedal potentiometer 52. The output of the reference ramp generator 50 is generally a linear output which is substantially constant under normal operating conditions. The constant output of the reference ramp generator, which is shown by the portions 62 of the curve illustrated in FIG. 10, is directed to the accelerator pedal potentiometer 52 which taps off a portion of the reference voltage from the reference ramp generator 50 and directs the output therefrom to the positive input of the reference operational amplifier 36 via the summing junctions 56 and 60. The accelerator pedal potentiometer 52 is attached to the accelerator pedal of the vehicle and the portion of the output of the reference ramp generator 50 which the accelerator pedal potentiometer 52 directs to the reference amplifier 36 is proportional to the position of the accelerator pedal and hence the speed of the vehicle. Thus, the signal from the reference ramp generator 50 as modified by the accelerator pedal potentiometer 52 has a magnitude which is proportional to the desired speed of the vehicle as indicated by the position of the accelerator pedal. This output from the reference ramp generator 50 normally controls the DC output from the reference operational amplifier 36 to thereby control the firing pulse generator and amplifier 28.

A maximum current limit circuit 64 is provided to see the current flowing in the motor 10 and prevent a predetermined maximum current from being exceeded. The maximum current limit circuit 64 senses a voltage developed across a resistor 66 which is series connected with the SCR 24. The voltage developed across resistor 66 is directly proportional to the motor current. The voltage developed across resistor 66 is directed across a current feedback resistor 68 and a certain percentage of this voltage applied to the negative input of an operational amplifier 70. The operational amplifier 70, schematically illustrated in FIG. 1 preferably has associated therewith feedback circuitry, not illustrated, which enables the output of the operational amplifier 70 to be a negative DC voltage proportional to the average value of the motor current. The negative output of the operational amplifier 70 is summed at the summing junction 60 with the DC output of the reference ramp generator 50 as modified by the accelerator pedal potentiometer 52 and then directed to the positive terminal of the reference operational amplifier 36. The output of the maximum current limit circuit 64 is a negative DC voltage which is offset against the positive output of the reference ramp generator 50 at the summing junction 60. The current feedback signal from the maximum current limit circuit 64 acts to limit the current flowing through the motor 10 by applying an increasing negative voltage to the summing junction 60 as the current through the motor 10 increases to thereby limit the output of the reference operational amplifier 36 and the period of conduction of SCR 24. The maximum current limit can be controlled by varying the arm of the current feedback resistor 68.

A minimum current circuit 72 provides an input at the negative input terminal of the reference operational amplifier 36. The minimum current circuit 72 which includes the potentiometer 74 applies a signal to bias the operational amplifier 36 so that when no signals are present at the positive input of the amplifier 36, the output of the amplifier 36 when added to the output the RC sawtooth generator 34 at the summing junction 38 will be just below the threshold level of the firing pulse generator and amplifier 28.

A plug sensing circuit 76 is provided to sense when the vehicle is traveling in a direction opposite to that called for by the closing of the appropriate contacts 14—18. When the vehicle is in normal operation, traveling in a first direction and the polarity of current flow through the motor field 22 is reversed to reverse the direction of the motor 10 by opening and closing the appropriate contacts 14-18 without stopping the vehicle, the vehicle will continue to travel in the first direction due to the inertia of the vehicle. The plug sensing circuit 76 will sense that the vehicle is traveling in the direction opposite to that called for by the contacts 14—18. The plug sensing circuit 76 senses the current passing through the diode 78. Normally, when the vehicle is traveling in the direction called for by the contacts 14—18 the current flow through diode 78 will be of a predetermined magnitude. When the vehicle is moving in a direction opposite to the direction called for by the contacts 14—18, the motor 10 will be driven by the vehicle's motion and will act as a generator pumping current through the free wheeling diode 78. The current flowing through the diode 78 will be of a large magnitude relative to the predetermined magnitude of the current flowing through the diode 78 when the motor 10 is rotating in the connect direction. The plug sensing 76 senses the magnitude of the voltage across the diode 78 to determine if a plug, i.e., travel of the vehicle in a direction opposite to the direction called for by the contacts 14—18, occurs. Upon occurrence of a plug, the plug sensing circuit 76 will apply a signal to the reference ramp generator 50 which causes the output of the reference ramp generator 50 to go to zero, as is graphically illustrated in FIG. 10.

The output of the referee ramp generator 50 is sensed by a dynamic braking and plug severity circuit 80. When the output of the reference ramp generator 50 drops to zero, the dynamic braking circuit 80 will activated to apply a small voltage to the positive input of the reference operational amplifier 36 via the summing junctions 56 and 60. The output of reference ramp generator 50 will remain at a zero level as long as a plug is sensed by the dynamic braking and plug severity circuit 80. When the vehicle comes to a stop and a plug is no longer sensed the ramp generator will generate a ramp signal illustrated at 82 in FIG. 10. The dynamic braking circuit 80 will continue to apply an input to the reference operational amplifier 36 until the output of the reference ramp generator 50 returns substantially to its original value indicated by the portion 62 of the curve of FIG. 10. Thus, during reacceleration of the vehicle a signal will be applied to the reference operational amplifier 36 by both the ramp generator 50 and the dynamic braking and plug severity circuit 80.

The small voltage applied to the positive input of the reference operational amplifier 36 by the dynamic braking circuit 80 when the vehicle is traveling in a direction opposite that called for by the contacts 14—18 enables the amplifier 36 to have an output signal which will effect continued firing of the firing pulse generator and amplifier 28. The firing of the firing pulse generator and amplifier 28 while the motor 10 is acting as a generator effects a small current flow through the motor 10 which tends to dynamically brake the motor since the voltage applied to the motor will tend to effect rotation of the motor in a direction opposite to that which the motor is rotating by the inertia of the vehicle. Thus, the dynamic braking circuit 80 dynamically brakes the vehicle and the motor to a smooth stop before it is reaccelerated in the opposite direction. When the vehicle comes to a stop and the output from the reference ramp generator 50 reaches its approximate normal maximum value, as indicated by the portions 62 of the curve in FIG. 10, the output from the dynamic braking circuit 80 disappears and the vehicle will travel in the direction opposite to which it has previously been going.

When the vehicle is running at full speed it is desirable to eliminate the 200-Hz switching of the motor current and instead apply full battery potential to the motor 10. Accordingly, a bypass circuit 86 is provided. The bypass circuit 86 is operable to sense the output of the reference ramp generator 50 and the position of the accelerator pedal of the vehicle. It should be appreciated that when it is desired to run the vehicle at full speed two conditions will be fulfilled, i.e., namely, the acceleration pedal will be fully depressed and the output of the reference ramp generator 50 will be at its maximum. When the accelerator pedal is fully depressed, an accelerator switch 82 will be closed. When the accelerator switch 82 is closed and the output of the reference ramp generator 50 is at approximately its maximum output, the bypass circuit 86 will energize a coil 88 of a relay to close the contact 88a of the relay which is connected in parallel to the SCR 24. Closing of the contacts 88a will enable the battery 12 to apply full power to the motor 10 so that the vehicle will run at full speed. The bypass circuit 86 also applies an input to a delay circuit 90 which shuts down the rest of the control system during full speed operation of the vehicle.

When relays are utilized as switches to control the energization of the motor 10 there is a short period after the relays are closed in which they do not make continuous contact. During this period the contacts of the relays bounce and therefore delay circuit 90 is utilized to prevent energization of the control system until after the contacts have stopped bouncing. The delay circuit 90 operates upon energization thereof to prevent energization of the commutating pulse generator and amplifier 44, the reference ramp generator 50, the RC sawtooth generator 34, and the reference operational amplifier 36. The delay circuit preferably provides a 200 millisecond delay after the relay contacts 14–18 have been closed before the control system may operate. As described above, the delay circuit 90 also functions in response to energization of the bypass circuit 86 to render components of the control system inactive during full speed operation of the motor 10.

A regulated power supply 92 is provided to energize the various components of the control system with voltages schematically illustrated in FIG. 1. The regulated power supply 92 is connected to the positive terminal of the battery 12 and is operable to apply regulated voltages to the different portions of the circuitry of the system. The power supply 92 includes a positive power supply 94 and a negative power supply 96. The positive power supply 94 has three outputs therefrom having potentials of plus 12 volts, plus 6.8 volts and 15 volts. The negative power supply has a single output of a minus 6.8 volts. The plus and minus 6.8 volts from the power supply 92 are used to energize the operational amplifiers 36 and 70. The 12 volt output is used to energize the reference ramp generator 50 and the dynamic braking circuit 80. The plus 15 volt output of the positive power supply 94 is used to energize the negative power supply 96, the plug sensing circuit 76, the firing pulse generator and amplifier 28, the commutating pulse generator and amplifier 44, the delay circuit 90, the RC sawtooth generator 34 and the oscillator 32.

Figure 2:
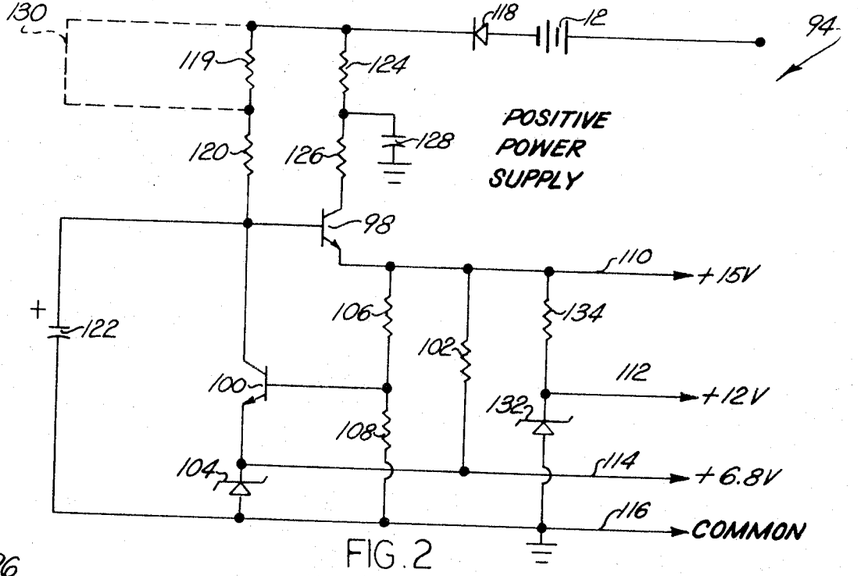
FIG. 2 is a schematic illustration of the positive power supply.

The positive power supply 94 which is more fully illustrated in FIG. 2, includes transistors 98 and 100. Transistor 98 is a series-regulating variable-impedance transistor whose conductivity is controlled by the collector current of transistor 100. A resistor 102 is connected between the emitter of transistor 98 and the emitter of transistor 100. The resistor 102 limits the amount of current flowing through Zener diode 104 which is connected to the emitter of transistor 100. The current flow through resistor 102 plus the emitter current of transistor 100 establishes the reference voltage for the Zener diode 104 which in this case is plus 6.8 volts. The base of transistor 100 provides a feedback network for the power supply and is connected to a pair of resistors 106 and 108 which form a voltage divider network having values such that line 110 will always be a plus 15 volts and the base of transistor 100 will be at 6.8 volts plus the base emitter voltage drop of transistor 100. An increase in the potential at the base of transistor 100 will tend to decrease the potential at the emitter of transistor 98 and a decrease in potential at the base of transistor 100 will tend to increase the potential at the emitter of transistor 98 to thereby hold line 110 at plus 15 volts. Thus, the transistors 98 and 100 cooperate to form a negative feedback amplifier utilizing Zener diode 104 as a reference.

The battery 12 is connected to the positive power supply 94 through a diode 118 which acts as an isolation diode to prevent negative voltage pulses from occurring in the power supply. When positive pulses occur, resistors 119 and 120 cooperate with the capacitor 122 to form a noise attenuation circuit for the base of transistor 98 and resistors 124 and 126 and capacitor 128 form a noise attentuation circuit for the collector of transistor 98. Since it is desired to utilize the regulated power supply with batteries having different potentials which may range approximately from 18 to 80 volts a jumper 130 is provided by bypass resistor 119. Generally, when the power supply 94 is used with a battery 12 having a potential above 36 volts the jumper 130 will not be utilized, but if a battery potential below 36 volts is utilized the jumper 130 will be connected across resistor 119 to isolate the resistor from the circuit.

The available outputs of the positive power supply 94 are plus 15 volts along line 110, plus 12 volts along line 112, plus 6.8 volts along line 114 and ground potential along line 116. The 12 volt output along line 112 is obtained by applying the 15 volt supply across the Zener diode 132. A resistor 134 is series connected with the Zener diode 132 to limit the current flow to the Zener diode 132.

Since the present control system utilizes operational amplifiers in stable high gain circuits, the provision of a negative power supply to operate the amplifiers is critical. The common way of producing a negative power supply is to utilize an inverter to drive a small transformer. However, the utilization of a transformer yields a bulky and costly configuration. The present control system utilizes an astable multivibrator for driving a diode-capacitor matrix illustrated in FIG. 3, which inverts the positive power supplied to the multivibrator directly to a negative voltage. This method is not only economical but also requires very little space.

Figure 3:
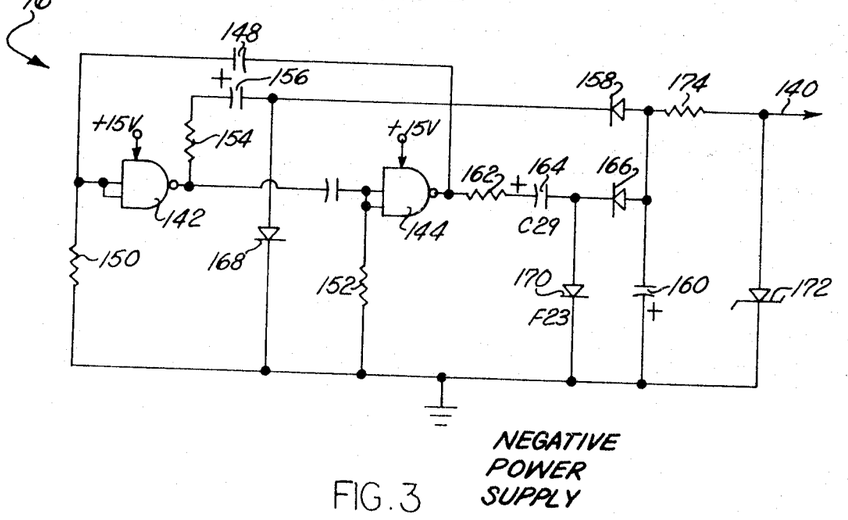
FIG. 3 is a schematic illustration of the negative power supply.

The astable multivibrator includes a pair of NAND gates 142 and 144 each having a plus 15 volt input from the positive power supply 94. A pair of capacitors 156 and 148 introduce feedback to the astable multivibrator. Resistors 150 and 152 are respectively connected to the input of the NAND gate 142 and the NAND gate 144. The resistors 150 and 152 are unequal to assure starting of the multivibrator formed by the NAND gates 142 and 144 upon the application of a potential thereto. When the output of the NAND gate 142 is high, the output of NAND gate 144 will be low and conversely when the output of NAND gate 144 is high the output of NAND gate 142 will be low.

Connected to the output of gate 142 is a resistor 154 and a capacitor 156. Capacitor 156 is connected through diode 158 to a capacitor 160. Connected to the output of gate 144 is a resistor 162 and a capacitor 164. The capacitor 164 is connected to the capacitor 160 through a diode 166. When the output of gate 142 is high, the capacitor 156 will charge, to approximately 15 volts with a polarity indicated by the plus sign in FIG. 3, through resistor 154 and through a diode 168 which is connected to the ground. When the output of gate 142 goes to low or ground, the capacitor 156 will attempt to discharge through the path including the output of gate 142, resistor 154, diode 158 and capacitor 160. The result of discharging of capacitor 156 through capacitor 160 is that the charge on capacitor 156 will be distributed between capacitors 160 and 156 according to the law of division of charge for capacitors. The polarity of the charge applied to capacitor 160 by capacitor 156 will be that shown by the plus sign in FIG. 3 associated with capacitor 160.

While capacitor 156 is charging capacitor 160, the NAND gate 144 will be in its high state charging capacitor 164 through the path including resistor 162 and a diode 170 which is connected to ground. The capacitor 164 will be charged to approximately 15 volts with the polarity indicated by the plus sign in FIG. 3 associated with capacitor 164. When the astable multivibrator changes state again and the output of gate 144 goes to ground, the capacitor 164 will discharge through the path consisting of the output of gate 144, resistor 162, diode 166 and capacitor 160. The discharging of capacitor 164 will again charge the capacitor 160 to a polarity indicated by the plus sign in FIG. 3. Thus, it should be apparent that the capacitor 156 will charge capacitor 160 during half of the period of oscillation of the astable multivibrator and capacitor 164 will charge capacitor 160 during the other half of the period. The result is a full wave output applied to capacitor 160. Connected across capacitor 160 is a Zener diode 172 having its cathode connected to the ground line. The Zener diode regulates the output from capacitor 160 to line 140, the output line of the negative power supply 96. A resistor 174 is connected to the anode of the Zener diode 172 to limit the current through the diode. Accordingly, the line 140 maintains a minus 6.8 volt potential thereon from capacitor 160.

Figure 4:
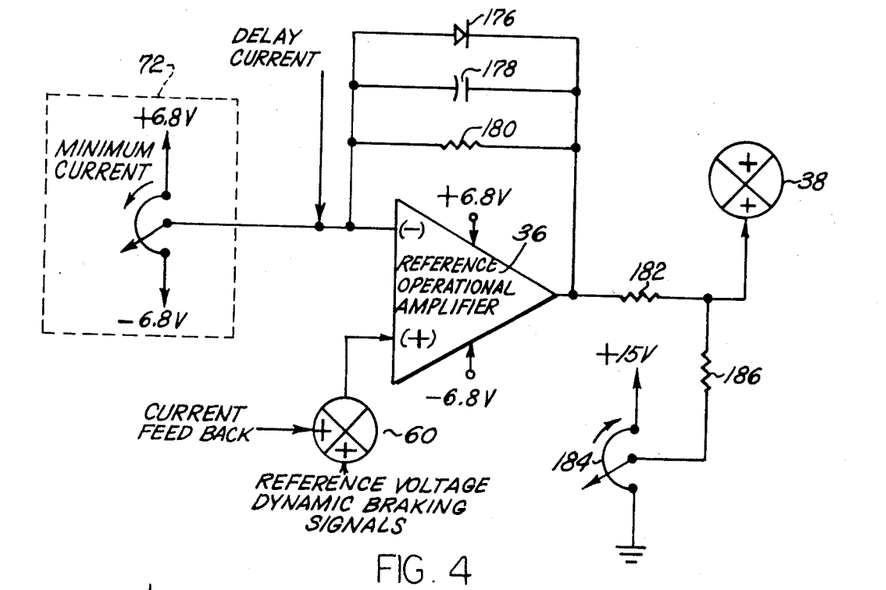
FIG. 4 is a schematic illustration of the reference operational amplifier.

For a complete understanding of the operation of the control system it is necessary to understand the operation of the reference operational amplifier 36 which is the point in the control system where the control signals converge. Applied to the positive input terminal of the control amplifier 36, as is more fully illustrated in FIG. 4, is the reference voltage from the reference ramp generator 50, dynamic braking feedback signal from the dynamic braking circuit 80 and the current limit signal from the current limit circuit 64. Applied to the negative input terminal of the control amplifier 36 is a signal from the delay circuit 90 and the minimum current signal from the minimum current circuit 72. The reference operational amplifier 36 introduces a lag in the closed loop system. Its feedback elements include a resistor 180 and a capacitor 178 which are parallel connected to a diode 176. The diode 176 acts as a clamping diode to clamp any negative output of the operational amplifier 36 to prevent the amplifier from saturating in the negative direction. The output of the operational amplifier 36 is fed to the summing junction 38 through a resistor 182. A potentiometer 184, connected to a resistor 186, which is connected to the summing junction 38 and the resistor 182, limits the maximum DC voltage that can be applied to the summing junction 38 by the output of the operational amplifier 36. The potentiometer 184 limits the maximum DC voltage output of the amplifier 36 to limit the maximum speed of the motor 10. The limiting of the output of the amplifier 36 limits the triggering of the firing pulse generator and amplifier 28 and the period of conduction of the main SCR 24 to thereby limit the speed of motor 10.

Figure 5:
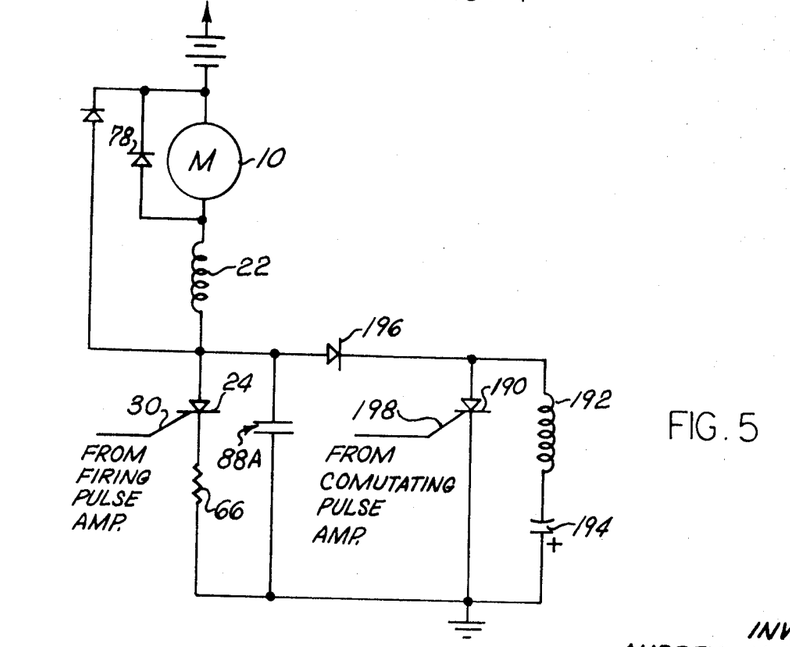
FIG. 5 is a schematic illustration of the main SCR and the commutating circuit.

The main SCR 24, which is turned on by the firing pulse generator and amplifier 28, is commutated or switched off at the end of each cycle of the oscillator 32 as described hereinabove. The commutating circuit 46, more fully illustrated in FIG. 5, includes a secondary SCR 190, an inductor 192, a capacitor 194 and a diode 196. For the purposes of clarity the directional contacts 14–18 have been eliminated from the schematic illustration in FIG. 5. The secondary SCR 190 is connected in a parallel circuit to the main SCR 24 with the cathode of SCR 190 connected to the cathode of the SCR 24. The inductor 192 and capacitor 194 are connected in a parallel circuit across SCR 190. When a pulse is applied to the gate 30 of the SCR 24, the SCR 24 conducts and the capacitor 194 is charged positively with respect to the ground through the diode 196 and inductor 192. The capacitor 194 and inductor 192 form a LC resonant circuit and the energy stored in capacitor 194 will substantially all be transferred to the inductor 192 when the capacitor 194 is discharged.

The SCR 190 has its gate 198 connected to the output of the commutating pulse generator and amplifier 44. When an output is applied to the gate 198 of the SCR 190, the SCR 190 will conduct. Conduction of the SCR 190 will cause the capacitor 194 to discharge through the inductor 192 and the SCR 190. The energy which is stored in the inductor 192 takes on the form of a current which must be kept flowing as long as the SCR 190 conducts. This current keeps flowing until the capacitor 194 is charged up to a polarity opposite to the polarity to which the capacitor 194 was originally charged. The capacitor is shown schematically with a plus sign in FIG. 5 charged to its opposite or reverse polarity after conduction of the SCR 190. The charge on the capacitor 194 causes a current flow to be applied to the cathodes of both SCRs 24 and 190. The current flow to the cathodes of SCRs 24 and 190 causes the cathodes thereof to become positive with respect to the anodes thereof. This effectively reverse biases the SCRs 24 and 190 causes the cathodes thereof to become positive with respect to the anodes thereof. This effectively reverse biases the SCRs 24 and 190 and turns them off to their nonconductive state. After the SCRs 24 and 190 have been turned off the capacitor 194 will recharge in the positive direction with respect to ground through the diode 196 to a voltage which is dependent upon the load inductance and resistance, the value of capacitor 194, the value of inductor 192 and the instantaneous value of the current through the load at the time the SCR 24 is turned off. The diode 196 acts as a blocking diode when the capacitor 194 is completely recharged to prevent the capacitor from discharging until SCR 190 is in its conductive state. Thus, it should be apparent that the LC circuit formed by the capacitor 194 and the inductor 192 operate upon triggering of the SCR 190 to commutate the SCR 24. As described hereinabove this occurs at the end of each cycle of the oscillator 32.

From the foregoing it should be apparent that a new and improved control system for controlling the energy applied from a power source to a load has been provided. The control system includes an oscillator, a sawtooth generator, a main SCR series connected with the load and a firing pulse generator. A reference operational amplifier applies a DC control signal to the firing pulse generator which is summed with the output from the sawtooth generator. When the magnitude of the summed outputs of the reference operational amplifier and the sawtooth generator reaches the threshold voltage of the firing pulse generator, the firing pulse generator will apply a potential to the gate of the main SCR to render the main SCR conductive. A commutating pulse generator having an input from the oscillator is connected to a commutating circuit. The commutating circuit includes a secondary SCR connected parallel to the main SCR and a LC circuit parallel connected to the secondary SCR. The LC circuit comprising an energy storage means which upon conduction of the secondary SCR discharges and recharges to a polarity opposite to the polarity of which the LC circuit was originally charged. Reversal of the polarity of the LC circuit reverse biases the main and secondary SCR to thereby render them nonconductive. The control system further includes a regulated power supply which includes a positive power supply and a negative power supply for energizing the various system components. The negative power supply includes an astable multivibrator and a diode-capacitor matrix which operates to directly invert a positive voltage to thereby provide a negative voltage at the output terminal thereof.

I now claim:

1. A control system for controlling energy supplied from a power source to a motor comprising first controlled rectifying means having a conductive and nonconductive condition connected to the motor for controlling the energization thereof, first generating means for generating a plurality of repetitive pulses of a predetermined period, second generating means connected to said first generating means for directing firing pulses to said first controlled rectifying means to render said first controlled rectifying means conductive at a predetermined time during each of said predetermined periods, third generating means for generating commutating pulses, commutating circuit means responsive to said third generating means for rendering said first controlled rectifying means nonconductive at the end of each of said predetermined periods, fourth generating means for generating a ramp signal upon acceleration of the motor from a zero speed condition, first control means for controlling the direction of rotation and the speed of the motor, speed and direction sensing means for affecting a substantially zero output from said fourth generating means when said speed and direction sensing means senses the rotation of said motor to be opposite the direction of rotation called for by said first control means, second control means having an input connected to said fourth generating means and an output connected to said second generating means for controlling the period of conduction of said first controlled rectifying means, dynamic braking means responsive to said speed and direction sensing means for applying an input to said second control means when said speed and direction sensing means senses the direction of rotation of the motor to be opposite the direction of rotation called for by said first control means to enable said second control means to effect conduction of said first controlled rectifying means at a predetermined minimum level to thereby dynamically brake the rotation of the motor, power supply means connected to the power source for applying predetermined potentials, and bypass means for rendering said first controlled rectifying means nonconductive and connecting the power source directly to the motor when said first control means is actuated to a full speed condition.

2. A control system for controlling energy directed from a power source to a motor as defined in claim 1 wherein said commutating circuit means includes a second controlled rectifying means and energy storage means connected parallel to said second controlled rectifying means, said energy storage means being charged to a first polarity and charging to a second polarity opposite said first polarity upon conduction of said second controlled rectifying means, said energy storage means when having said second polarity, reverse biasing said first and second controlled rectifying means to render said controlled rectifying means nonconductive.

3. A control system for controlling energy directed from a power source to a motor as defined in claim 2 wherein said energy storage means including an inductor and a capacitor series connected to form a LC resonant circuit, said second controlled rectifying means being connected parallel to said first controlled rectifying means, said LC resonant circuit being connected parallel to said second controlled rectifying means, said capacitor charging to a first polarity when said second controlled rectifying means is nonconductive and discharging through said inductor and said second controlled rectifying means upon conduction of said second controlled rectifying means, said capacitor charging to a second polarity, opposite said first polarity, upon discharge thereof through said inductor and said second controlled rectifying means, said capacitor when charged to said second polarity reverse biasing said first and second controlled rectifying means to render said first and second controlled rectifying means nonconductive.

4. A control system for controlling energy directed from a power source to a motor as defined in claim 1 wherein said power supply means includes an astable multivibrator and a diode-capacitor matrix connected to the output of said astable multivibrator for applying a regulated voltage to said second control means.

5. A control system for controlling energy directed from a power source to a motor as defined in claim 4 wherein said astable multivibrator includes first and second NAND gates connectable to the power source, each of said NAND gates having first and second output conditions, said first NAND gate having said first output condition when said second NAND gate has said second output condition and said first NAND gate having said second output condition when said second NAND gate has said first output condition, and said diode-capacitor matrix includes a first capacitor connected to the output of said first NAND gate, a second capacitor connected to the output of said second NAND gate, and a third capacitor connected to said first and second capacitors for applying a predetermined voltage, said first capacitor charging when said first gate is in said first condition and discharging when said first gate is in said second condition, said second capacitor charging when said second gate is in said first condition and discharging when said second gate is in said second condition, said third capacitor being charged by said first capacitor when said first NAND gate is in said second condition and being charged by said second capacitor when said second NAND gate is in said second condition, said third capacitor being charged by said first and second capacitors to a predetermined negative potential with respect to the power source.

6. A control system for controlling energy directed from a power source to a motor as defined in claim 5 wherein said power supply further includes a Zener diode connected parallel to said third capacitor for regulating the negative output voltage applied by said third capacitor.

7. A control system for controlling energy directed from a power source to a motor as defined in claim 4 wherein said commutating circuit means includes a second controlled rectifying means and energy storage means connected parallel to said second controlled rectifying means, said energy storage means being charged to a first polarity and charging to a second polarity opposite said first polarity upon conduction of said second controlled rectifying means, said energy storage means when having said second polarity reverse biasing said first and second controlled rectifying means to render said controlled rectifying means nonconductive.

8. A control system for controlling energy directed from a power source to a motor including a first controlled rectifying means connected to the motor for controlling the energization thereof by pulse width modulation, a firing pulse generator connected to the gate of said first controlled rectifying means for periodically rendering said first controlled rectifying means conductive, a commutating circuit including a second controlled rectifying means connected parallel to said first controlled rectifying means, a resonant circuit connected parallel to said second controlled rectifying means, a commutating pulse generator connected to the gate of said second controlled rectifying means for periodically rendering said second controlled rectifying means conductive, said resonant circuit acting upon conduction of said second controlled rectifying means to reverse bias said first controlled rectifying means thereby rendering said first controlled rectifying means nonconductive, first control means for determining the direction of rotation of said motor, plug sensing means for sensing when the motor is rotating in a direction opposite to that called for by said first control means and dynamic braking circuitry for maintaining said firing pulse generator operating at a predetermined minimal value while the motor is traveling in a direction opposite that called for by the first control means to dynamically brake the motor.

9. A control system for controlling energy directed from a power source to a motor as defined in claim 8 further including a regulated negative power supply including an astable multivibrator connected to the power source and a diode-capacitor matrix connected to the output of said astable multivibrator for directly inverting the power supplied to said astable multivibrator by the power source to produce a negative output voltage.

10. A control system for controlling energy directed from a power source to a motor as defined in claim 8 further including an oscillator, a sawtooth generator, and a reference operational amplifier, for producing a DC control signal at the output thereof, said output of said reference operational amplifier being summed with the output of said sawtooth generator and being applied to said firing pulse generator, said summed output of said sawtooth generator and said reference operational amplifier actuating said firing pulse generator upon exceeding a predetermined threshold voltage to thereby effect conduction of said first controlled rectifying means, said commutating pulse generator having an input from said oscillator and actuating said commutating circuit at the end of each cycle of said oscillator.

11. A control system for controlling energy directed from a power source to a motor as defined in claim 10 further including a reference ramp generator, for producing an output applied to a positive input of said reference operational amplifier and a maximum current limit circuit for sensing the current flow through the motor and applying a negative input signal to the positive input of said reference operational amplifier.

12. A control system for controlling energy directed from a power source to a motor as defined in claim 11 wherein said plug sensing means has an output directed to said reference ramp generator when the motor is rotating in a direction opposite to that called for by said first control means to effect a substantially zero output from said reference ramp generator and said dynamic braking circuitry responsive to the output of said reference ramp generator, said dynamic braking circuitry having an output therefrom directed to the positive input of said reference operational amplifier when the output of said reference ramp generator goes to substantially zero, said output of said dynamic braking circuit effecting a minimal output from said reference operational amplifier to enable the summed output of said reference operational amplifier and said sawtooth generator to exceed the threshold voltage of said firing pulse generator to thereby effect firing of said first controlled rectifying means to dynamically brake the motor when it is traveling in a direction opposite to that called for by said first control means.

13. A control system for controlling energy directed from a power source to a motor as defined in claim 9 further including bypass circuit means, said bypass circuit means including a pair of normally open contacts connected parallel to said first controlled rectifying means, said contacts closing in response to an output from said bypass circuit means to apply full potential from the power source to the motor, means responsive to the speed of the motor for closing said contacts when the motor is running at full speed and means for rendering said first controlled rectifying means nonconductive when the motor is running at the full speed.

14. A control system for controlling energy directed from a power source to a motor as defined in claim 9 further including first control means including at least a pair of contacts connected to the motor for effecting energization thereof and delay circuit means for delaying the output of said firing pulse generator after closing of said contacts to prevent bouncing of said contacts from interfering with the energization of the motor.

* * * * *

PO-1050
(5/69)

UNITED STATES PATENT OFFICE
CERTIFICATE OF CORRECTION

Patent No. 3,710,216                Dated 1/9/73

Inventor(s) A. H. Smith

It is certified that error appears in the above-identified patent and that said Letters Patent are hereby corrected as shown below:

| | |
|---|---|
| Col. 4, line 5:<br>Pg. 6, line 25: | After "field" insert---22---. |
| Col. 4, line 19:<br>Pg. 7, line 8: | After "SCR" insert---24---. |
| Col. 4, line 36<br>Pg. 7, line 29: | After "sawtooth" --enerator--should read ---generator---. |
| Col. 7, line 24:<br>Pg. 12, line 29: | After "sensing" insert---circuit---. |
| Col. 7, line 33:<br>Pg. 13, line 6: | "referee" should be---reference---. |
| Col. 7, line 36:<br>Pg.13, line 9: | After "will" insert---be---. |
| Col. 12, lines 6-8:<br>Pg. 21, line 22: | Delete ---This effectively reverse------the anodes thereof.-----. This is a repeat. |

Signed and sealed this 29th day of May 1973.

(SEAL)
Attest:

EDWARD M. FLETCHER, JR.
Attesting Officer

ROBERT GOTTSCHALK
Commissioner of Patents